(12) United States Patent
Venville

(10) Patent No.: US 8,123,941 B2
(45) Date of Patent: Feb. 28, 2012

(54) SAND FILTER AND METHOD OF CONSTRUCTING SAME

(75) Inventor: Kevin John Venville, West Burleigh (AU)

(73) Assignee: H2O World Wide Water Solutions Pty Ltd., Queensland (AU)

(*) Notice: Subject to any disclaimer, the term of this patent is extended or adjusted under 35 U.S.C. 154(b) by 867 days.

(21) Appl. No.: 11/795,475

(22) PCT Filed: Jan. 17, 2006

(86) PCT No.: PCT/AU2006/000056
§ 371 (c)(1),
(2), (4) Date: Apr. 7, 2008

(87) PCT Pub. No.: WO2006/074529
PCT Pub. Date: Jul. 20, 2006

(65) Prior Publication Data
US 2008/0302715 A1 Dec. 11, 2008

(30) Foreign Application Priority Data

Jan. 17, 2005 (AU) ................ 2005900172
Jan. 20, 2005 (AU) ................ 2005900228
Oct. 11, 2005 (AU) ................ 2005905595

(51) Int. Cl.
*B01D 24/14* (2006.01)

(52) U.S. Cl. ........ 210/265; 210/283; 210/289; 210/290; 210/291; 29/428

(58) Field of Classification Search ............ 210/290, 210/283, 289, 291, 617, 265, 807; 29/428
See application file for complete search history.

(56) References Cited

U.S. PATENT DOCUMENTS

| 522,043 A | * | 6/1894 | Bowden | 210/120 |
| 3,306,447 A | * | 2/1967 | Medeiros | 210/121 |
| 3,574,096 A | * | 4/1971 | Carlstedt | 516/138 |
| 4,374,029 A | * | 2/1983 | Jaisinghani | 210/671 |
| 4,765,892 A | * | 8/1988 | Hulbert et al. | 210/290 |
| 5,108,614 A | * | 4/1992 | Ross et al. | 210/665 |
| 5,679,252 A | * | 10/1997 | Gotou et al. | 210/614 |
| 6,241,881 B1 | * | 6/2001 | Pezzaniti | 210/155 |
| 6,315,897 B1 | | 11/2001 | Maxwell | 210/170 |
| 2004/0256304 A1 | | 12/2004 | Perry | |
| 2008/0041782 A1 | * | 2/2008 | Pattee | 210/532.2 |

FOREIGN PATENT DOCUMENTS

| CA | 2105650 | 3/1995 | |
| DE | 10318708 | 11/2004 | |
| GB | 1171399 | 11/1969 | |
| JP | 56037014 A * | 4/1981 | 210/290 |
| JP | 2095402 | 4/1990 | |
| JP | 5023509 | 2/1993 | |
| JP | 5049814 | 3/1993 | |
| JP | 6106159 | 4/1994 | |
| JP | 8108012 | 4/1996 | |

* cited by examiner

*Primary Examiner* — Matthew Savage
(74) *Attorney, Agent, or Firm* — Michael Haynes PLC; Michael N. Haynes

(57) ABSTRACT

A sand filter apparatus (10) for treating water includes a filter retention vessel (16) having an outlet (18) from which filtrate can be supplied. An inlet arrangement (48) is in fluid communication with the filter retention vessel and is connectable to a supply of waste water. A filter is interposed between the inlet arrangement and the outlet. The filter includes two layers of aggregate (12, 36) and a layer of sand (26) interposed between the two layers of aggregate. The sand is at least one of, or a mixture of, granite-based sand and substantially pure silica based sand.

20 Claims, 14 Drawing Sheets

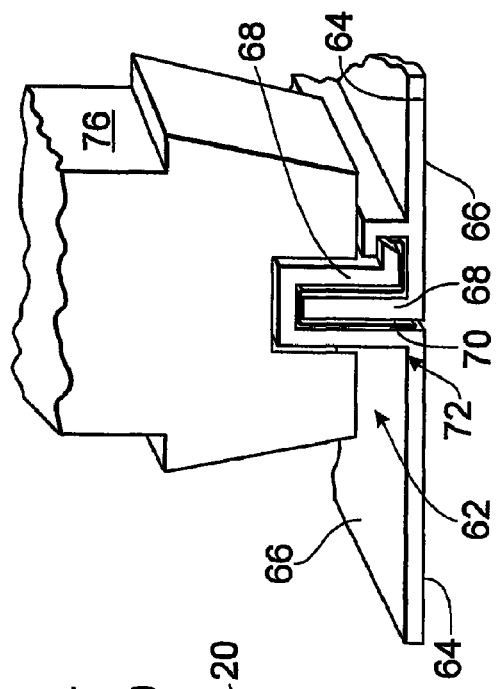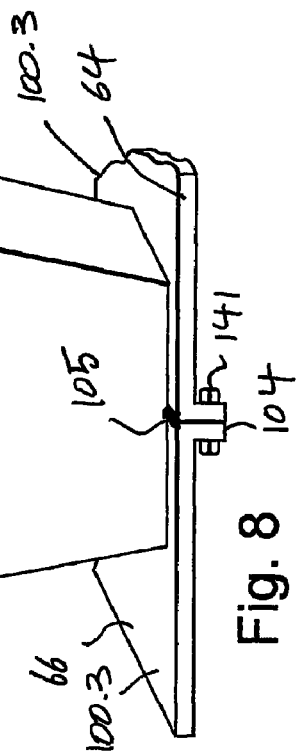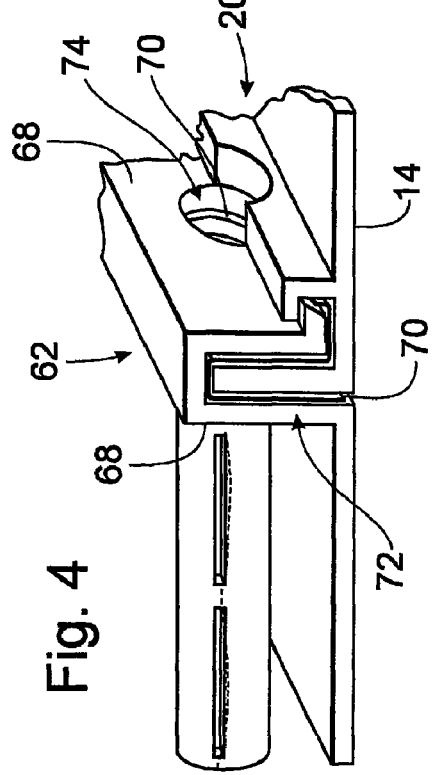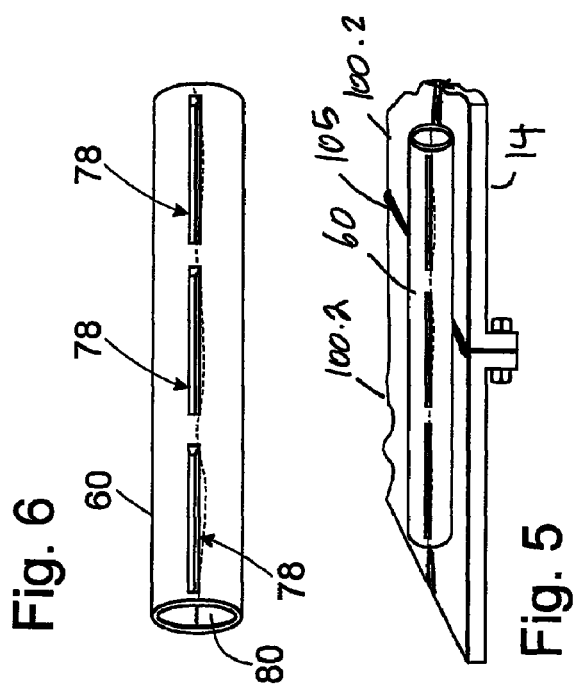

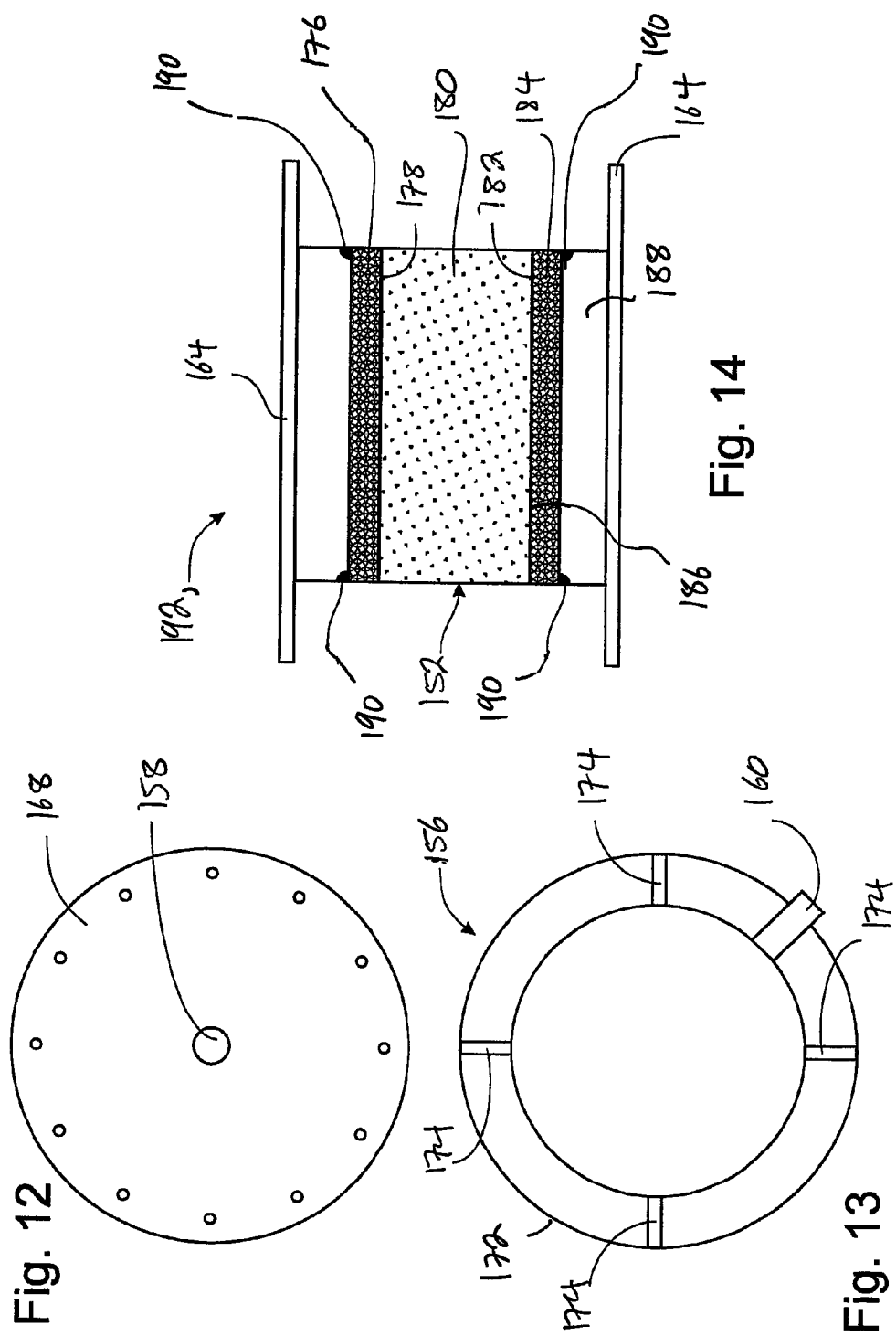

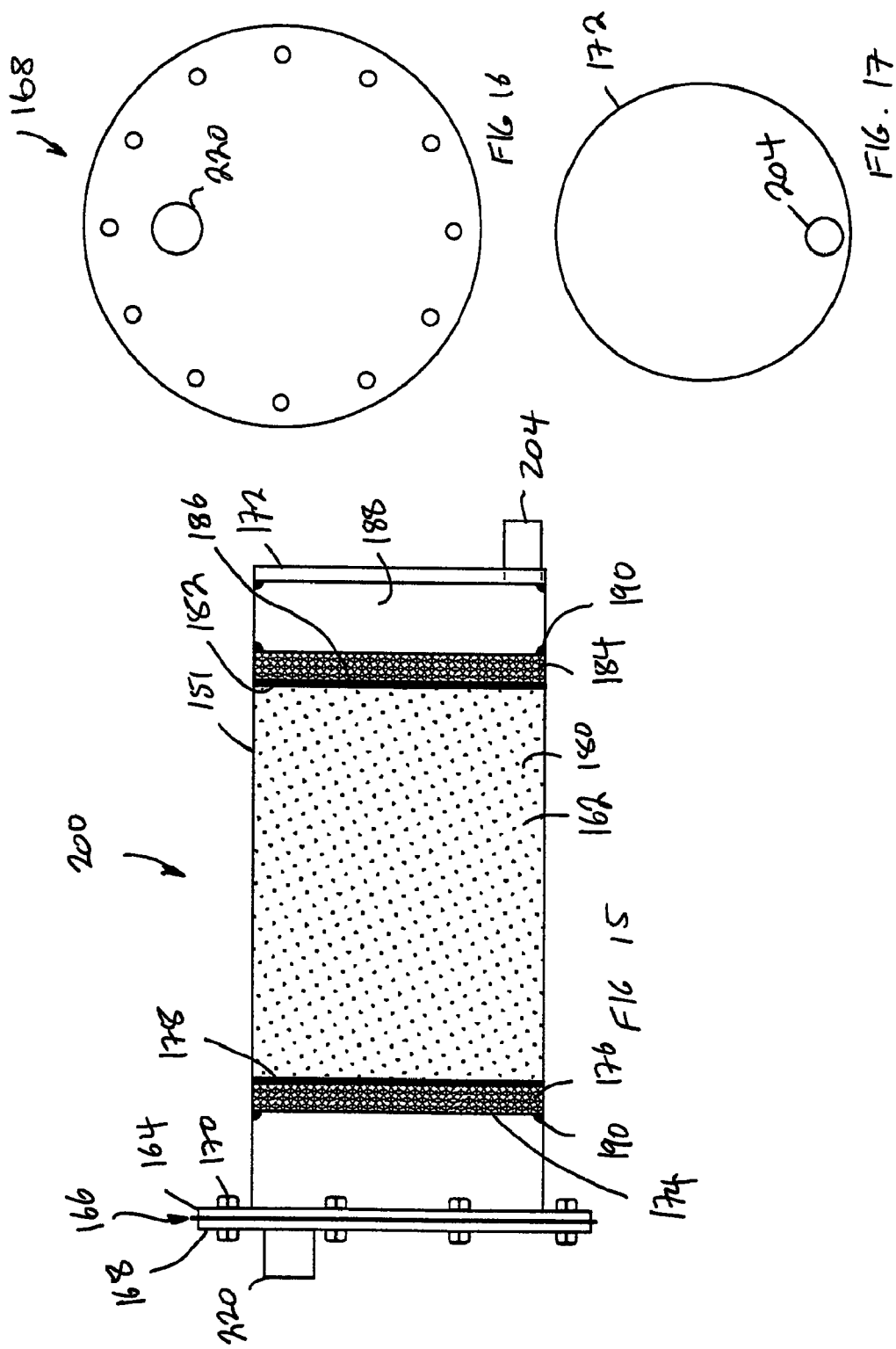

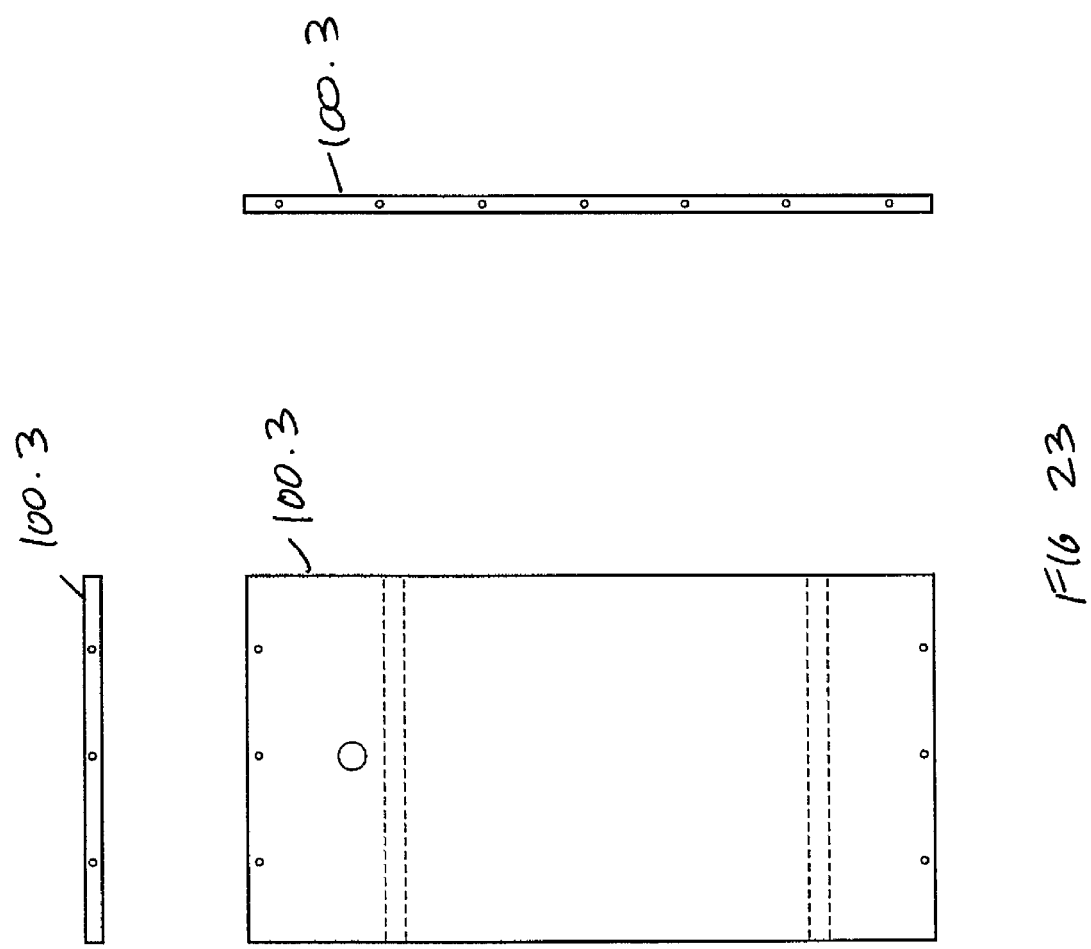

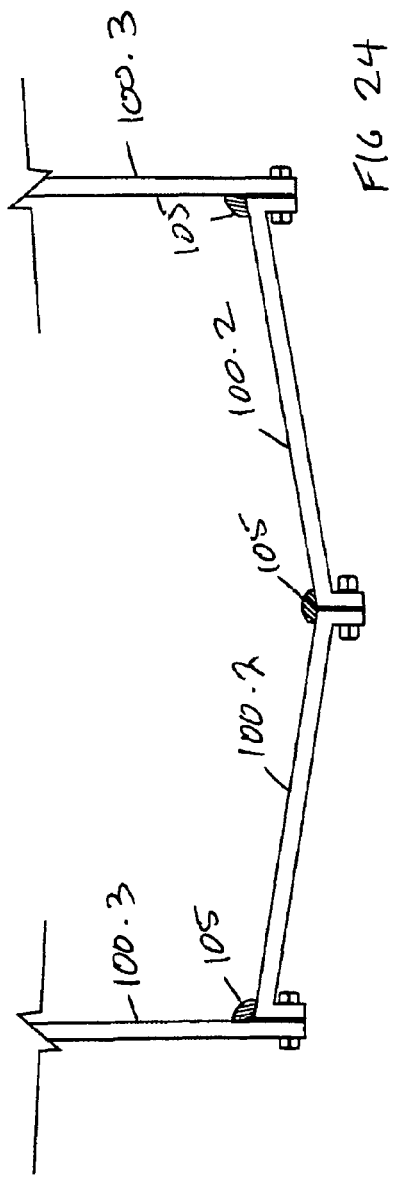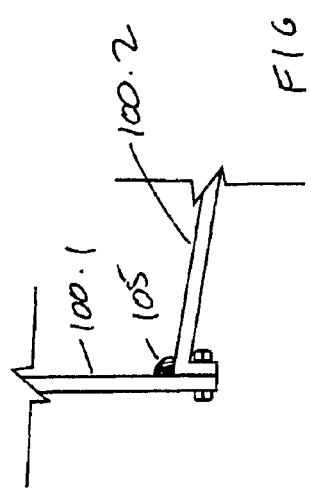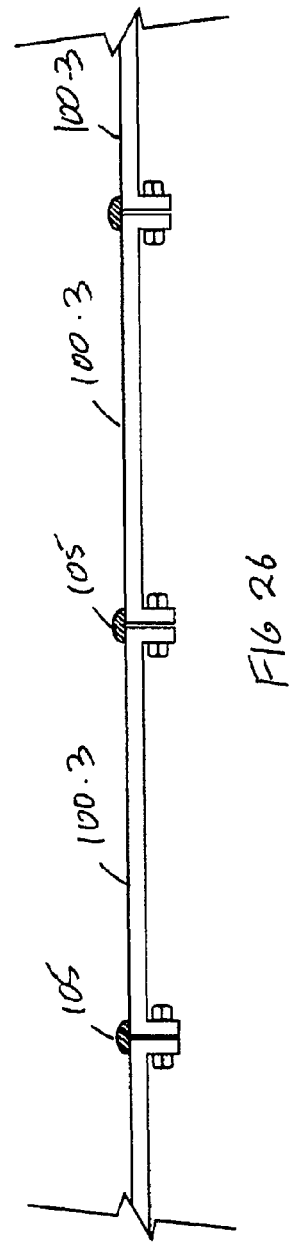

SAND FILTER AND METHOD OF CONSTRUCTING SAME

FIELD OF THE INVENTION

This invention relates to water treatment. More particularly, this invention relates to a sand filter apparatus for water treatment and to a method of treating water.

BACKGROUND OF THE INVENTION

An extremely large range of methods and apparatus are presently used for the treatment of water. These are based on various principles. The principles include micro-filtration and aerobic breakdown of waste material. Both principles are often combined. Furthermore, one or both of the principles are used together with a disinfecting arrangement to achieve water that is suitable for discharge into the environment and even potable in some cases.

A problem with presently available systems is the level of maintenance required and the cost of supply and installation. Micro-filtration systems require regular cleaning of micro-filters. Furthermore, micro-filter elements can be expensive. Systems based only on aerobic breakdown of waste material, particularly black water, often do not achieve sufficiently low levels of faecal matter and other effluent components such as eggs of intestinal worms.

A popular form of filtration is the use of sand filters. Sand filters are attractive since they are relatively cheap to install and, with an appropriate selection of sand, can provide a filtrate which is suitable for discharge into the environment.

This invention is directed to a system that uses slow sand filtration. Slow sand filtration has been used successfully in Europe since the early 1900's, and is still a popular method of treating municipal waste water. Research has shown that slow sand filtration can effectively remove *Giardia* cysts and coliform bacteria from raw water. Slow sand filtration has proved to be a cost-effective and low maintenance treatment process.

In general, a slow sand filter comprises a bed of sand which is supported by a layer of gravel. The filtration process is effective in removing solids, precipitates, turbidity and in some cases bacterial particles that produce bad taste and odour. The effectiveness of the slow sand filter lies in the provision of a very high surface area by the particles of sand which is colonised by bacteria that break down harmful pathogens in the waste water. The efficiency of the process is dependent on the particle size distribution of the sand, the ratio of surface area of the filter to depth and the flow rate of water through the filter.

It has been found by the Applicant that the selection of suitable sand is extremely difficult. Furthermore, in order to inhibit blocking, it is necessary to interpose one or more layers of a suitable aggregate between layers of the sand.

The sand used should be as insoluble in water as possible. In the event that the sand is soluble, the filtrate can leach out undesirable chemicals. For example, with alluvial sands, chemicals such as sulphates, which cause acidity in water, can leach out.

Applicant has conceived the present invention to address the problems associated with presently available sand filters. Furthermore, Applicant has developed a filtration apparatus that has an improved configuration.

Applicant has found that sand filtration can be successfully used for filtering circulating, warm water that can harbour pathogens. An example of such circulating water is the cooling water used to cool air conditioning units such as those used to cool multi-storey apartment buildings. Accordingly, Applicant has conceived an aspect of the invention to provide an effective treatment of such circulating water based on the principles of slow sand filtration.

SUMMARY OF THE INVENTION

According to a first aspect of the invention, there is provided a sand filter apparatus for treating water, the apparatus including
- a filter retention vessel having an outlet from which filtrate can be supplied;
- an inlet arrangement in fluid communication with the filter retention vessel and connectable to a supply of waste water;
- a filter interposed between the inlet arrangement and the outlet, the filter including two layers of aggregate and a layer of sand interposed between the two layers of aggregate, the sand being at least one of, or a mixture of, granite-based sand and substantially pure silica sand; and
- a distribution arrangement connected to the inlet arrangement and configured to distribute waste water from the inlet onto the filter.

The inlet arrangement may be connectable to one of discharge plumbing and a discharge outlet of a waste water treatment apparatus.

A geo-fabric layer may be interposed between the layer of sand and each layer of aggregate.

The aggregate may be granite-based.

The filter retention vessel may have a floor, a pair of opposed side walls extending from major sides of the floor and a pair of end walls extending from minor sides of the floor, the filter spanning the floor so that a width of the filter is a distance between the side walls. The layers of aggregate may be a lower layer positioned on the floor and an upper layer positioned on the sand layer.

The filter retention vessel may be modular and may include at least one filter retention vessel module that is configured to be fastened to a further filter retention vessel module if a length of the filter retention vessel is to be increased. The, or each, filter retention vessel module may include a floor module and side wall modules so that an effective floor and side wall length can be increased with further retention vessel modules. The distribution arrangement may also be modular to accommodate the filter retention vessel.

The floor, side wall and end walls of the filter retention vessel may be in the form of substantially flat panels configured to be fastened together, on site.

The lower aggregate layer may have a depth to width ratio of between 0.05 and 0.15. More particularly, the lower aggregate layer may have a depth to width ratio of approximately 0.09. The lower aggregate layer itself may have a lower sub-layer with an aggregate size of between approximately 20 mm and 25 mm and an upper sub-layer with an aggregate size of between approximately 3 mm and 10 mm. The lower sub-layer may have a depth to width ratio of between 0.025 and 0.125 and the upper sub-layer may have a depth to width ratio of between 0.003 and 0.03. More particularly, the lower sub-layer may have a depth to width ratio of approximately 0.075 and the upper sub-layer may have a depth to width ratio of approximately 0.0125.

The upper aggregate layer may have an intermediate sub-layer with an aggregate size of between approximately 20 mm and 25 mm, a top sub-layer with an aggregate size of between approximately 3 mm and 10 mm and a lower sub-layer with an aggregate size of between 3 mm and 10 mm. The upper sub-layer may have a depth to width ratio of between 0.003 and 0.03, more particularly 0.0125. The intermediate sub-layer may have a depth to width ratio of between 0.025 and 0.125, more particularly 0.075. The lower sub-layer may have a depth to width ratio of between 0.003 and 0.03, more particularly 0.0125.

A depth to width ratio of the sand layer may be 0.125 to 0.375. More particularly, a depth to width ratio of the sand layer may be approximately 0.25.

The inlet arrangement may be positioned at one of the end walls of the vessel. The inlet arrangement may include a catchment vessel in which waste water to be filtered is collected.

A carbon filter arrangement may be received in the catchment vessel to apply a carbon filtering step to the water.

The inlet arrangement may include a settling vessel in which waste water is received to permit settling and initial biodegradation of the waste water prior to filtration.

The distribution arrangement may include a distribution manifold connected to the inlet arrangement and spanning the vessel. A series of feed conduits may extend from the distribution manifold along a length of the filter retention vessel so that waste water is distributed over the upper aggregate layer. Each feed conduit may define feed openings positioned so that waste water is fed substantially evenly along a length of each feed conduit.

A floor of the vessel may be shaped to have a deepest zone to facilitate the collection of filtrate. A filtrate conduit may be positioned in the deepest zone, the filtrate conduit defining filtrate openings to permit filtrate to be fed into the conduit from the lower aggregate layer and the filtrate conduit being connected to the outlet so that filtrate can be fed from the filter retention vessel.

The sand filter apparatus may include a filtrate vessel connected to the outlet to receive and store filtrate.

According to a second aspect of the invention, there is provided a kit for a sand filter apparatus as claimed in claim 6, the kit including a number of the vessel modules configured to be connected together to define the filter retention vessel and a number of the distribution modules configured to be connected together.

According to a third aspect of the invention, there is provided a sand filter apparatus for filtering water, the apparatus including a vessel defining an inlet through which water to be filtered can be supplied and an outlet through which filtered water can be discharged; and a filter for locating in the vessel between the inlet and the outlet, the filter including a layer of sand being at least one of, or a mixture of, granite-based sand and substantially pure silica sand.

The sand filter apparatus may further include first and second layers of aggregate between which the layer of sand is located. The first and second layers of aggregate may be of bluestone pebbles. The bluestone pebbles may be less than approximately 5 mm in diameter.

Instead, the first and second layers of aggregate may be of calcium carbonate pebbles. More particularly, the pebbles may be marble.

A first strainer may be located between the inlet and the first layer of aggregate. A second strainer may be located between the second layer of aggregate and the outlet. The first and second strainers may each include a foraminous plate.

A first layer of one of geo fabric and drainage cloth may be located between the first layer of aggregate and the layer of sand and a second layer of one of a geo fabric and drainage cloth may be located between the layer of sand and the second layer of aggregate.

According to a fourth aspect of the invention, there is provided a method of constructing a sand filtration apparatus, the method including the steps of:

forming a lower layer of aggregate on a floor of a filtration vessel so that the aggregate is in fluid communication with a discharge opening of the vessel;

forming a layer of sand on the lower layer of aggregate; and forming an upper layer of aggregate on the layer of sand.

The method may include the step of positioning one of a geo fabric cloth and a drainage cloth between the layer of sand and each layer of aggregate.

For a filtration vessel of variable length, the lower layer of aggregate may be formed to have a depth to width ratio of approximately 0.05 to 0.15, more particularly 0.09.

For a filtration vessel of variable length, the lower layer of aggregate may be formed to itself have a lower sub-layer with an aggregate size of between 20 mm and 25 mm, a depth to width ratio of between approximately 0.025 and 0.125, more particularly, 0.075. The lower layer of aggregate may also be formed to have an upper sub-layer with an aggregate size of between 3 mm and 10 mm, a depth to width ratio of between approximately 0.003 and 0.03, more particularly, 0.0125.

For a filtration vessel of variable length, the upper layer of aggregate may be formed to itself have an intermediate sub-layer with an aggregate size of between 20 mm and 25 mm, an upper sub-layer with an aggregate size of between 3 mm and 10 mm, and a lower sub-layer with an aggregate size of between 3 mm and 10 mm.

The upper and lower sub-layers may be formed to each have depth to width ratios of between approximately 0.003 to 0.03, more particularly 0.0125, and the intermediate sub-layer may be formed to have a depth to width ratio of between approximately 0.025 and 0.125, more particularly 0.075.

The method may include the step of forming the sand from a mixture of granite-based sand and substantially pure silica sand. The mixture of sand may be formed such that 25 percent to 75 percent of the mixture is substantially pure silica sand.

According to a fifth aspect of the invention, there is provided an ablution arrangement which includes a foraminous structure;

a water supply device positioned above the foraminous structure such that water from the water supply device can pass through the foraminous structure;

a filter positioned beneath the foraminous structure to receive water passing through the foraminous structure, the filter including two layers of aggregate and a layer of sand interposed between the two layers of aggregate, the sand being at least one of, or a mixture of, granite-based sand and substantially pure silica sand;

a filtrate reservoir positioned beneath the filter to receive and store filtrate from the filter; and a pump for pumping water to the water supply device.

The foraminous structure may be configured to support a user so that the water supply device can take the form of a shower.

The ablution arrangement may include a water level control arrangement positioned in the filtrate reservoir and being operable on the pump to control a level of water in the filtrate reservoir.

The invention is now described, by way of examples, with reference to the accompanying drawings. The following description is intended to describe the best manner of performing the invention known to the Applicant at the time of filing the application. As such, the specific nature of the following description is not intended to limit the broad scope of the preceding paragraphs.

BRIEF DESCRIPTION OF THE DRAWINGS

FIG. 4 shows a sectioned view through one example of a floor of the sand filtration apparatus at "A" in FIG. 3.

FIG. 5 shows a sectioned view through another example of a floor of the sand filtration apparatus at "A" in FIG. 3.

FIG. 6 shows part of a water distribution conduit or filtrate conduit of the sand filtration apparatus at "A" or "B" in FIG. 3.

FIG. 7 shows a view from the top of one example of the part "C" in FIG. 3.

FIG. 8 shows a view from the top of another example of the part "C" in FIG. 3.

FIG. 12 shows a plan view of a lid of the sand filter apparatus of FIG. 9;

FIG. 13 shows a plan view of the base of the sand filter apparatus of FIG. 9;

FIG. 14 shows a sand filter module, also in accordance with the invention, which can be connected in series with the sand filter apparatus of FIG. 9 to form a two-stage filter.

FIG. 15 shows a side view of another embodiment of a sand filter apparatus of the invention.

FIG. 16 shows an inlet end view of the sand filter apparatus of FIG. 15.

FIG. 17 shows an outlet end view of the sand filter apparatus of FIG. 15.

FIG. 23 shows front, side and end views of side panels of the sand filter apparatus of FIG. 3.

FIG. 24 shows how floor panels of the sand filter apparatus are connected to the side panels.

FIG. 25 shows how a floor panel of the sand filter apparatus is connected to an end panel.

FIG. 26 shows how side panels of the sand filter apparatus are connected together.

DETAILED DESCRIPTION OF THE DRAWINGS

Figure 1:
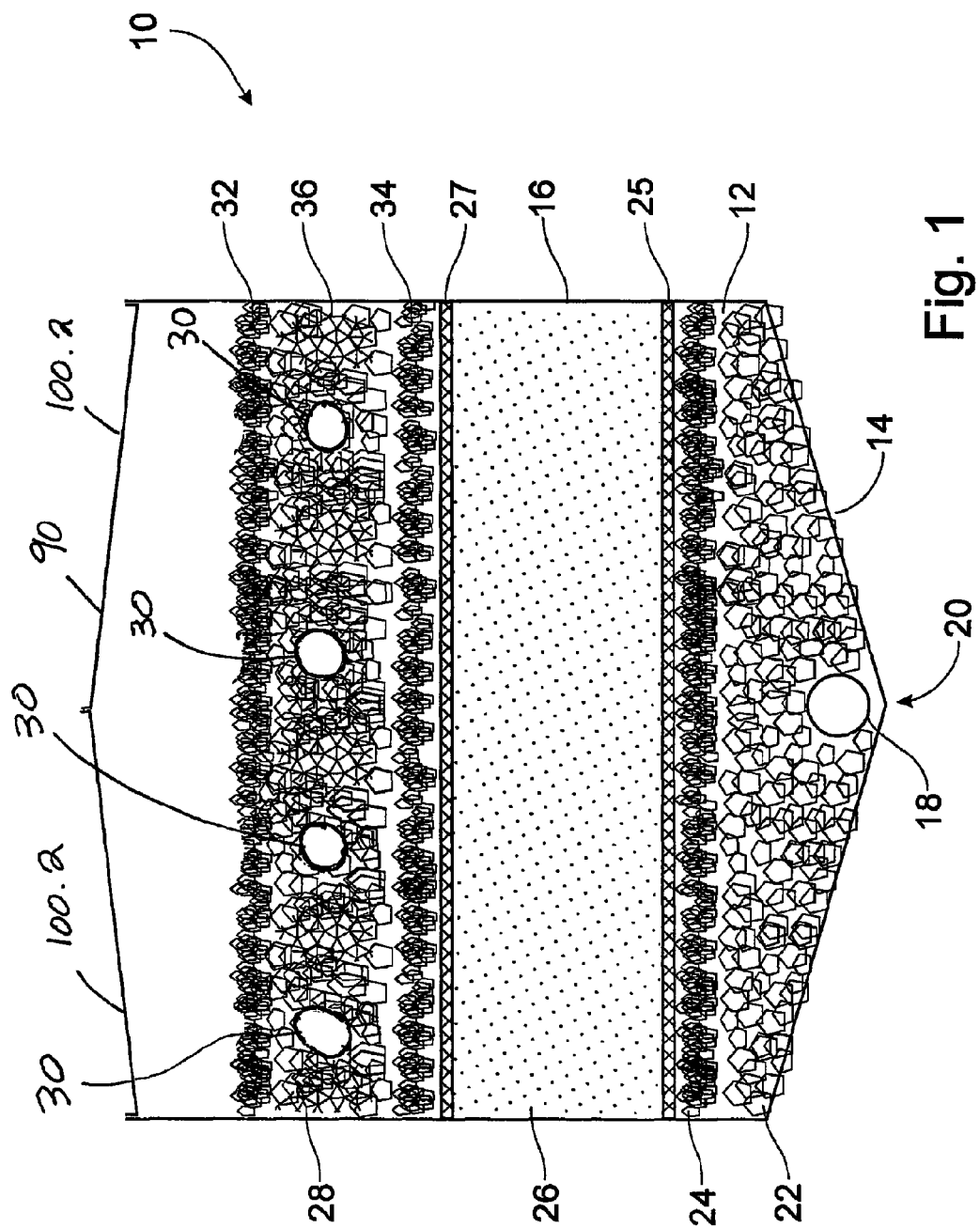
FIG. 1 shows a sectioned view of a sand filtration apparatus in accordance with the invention.

In FIG. 1, reference numeral 10 generally indicates a schematic sectioned end view of a sand filtration apparatus in accordance with the invention and also constructed in accordance with a method of the invention.

The method includes forming a layer 12 of a granite-based aggregate on a floor 14 of a filter retention vessel 16. The floor 14 is generally V-shaped in cross section and has a filtrate conduit 18 at an apex 20, which is the deepest part of the floor 14.

For the purposes of this example, the vessel 16 is of indeterminate length and has a width of 4 m.

The layer 12 extends above the conduit 18 and has an overall thickness of 350 mm. In particular, the layer comprises a lower layer 22 with an aggregate size of between approximately 20 and 25 mm and an upper layer 24 with an aggregate size of approximately 6 mm. The lower layer 22 has a thickness of 300 mm, while the upper layer 24 has a thickness of 50 mm.

A geo-fabric material 25 is positioned on the layer 12. A layer 26 of sand is formed on the geo-fabric layer 25. The layer 26 has a thickness of approximately 1000 mm. The sand is a mixture of granite-based and substantially pure silica sand. In particular, between a quarter and three quarters of the sand can be the substantially pure silica sand.

In this embodiment, the silica sand is known as Stradbroke Fine White, being sourced from Stradbroke Island in Australia. The granite-based sand is known as Stanthorpe Coarse and is sourced from granite-rich quarries in a region known as the granite belt in Australia.

Further geo-fabric material 27 is positioned on the layer 26 of sand. A layer 28 of aggregate is formed on the layer 26. The layer 28 includes upper and lower layers 32, 34 and an intermediate layer 36 interposed between the upper and lower layers 32, 34. Distribution conduits 30 are positioned in the upper layer 32 to distribute waste water to be treated substantially evenly into the upper layer 32.

The intermediate layer 36 has an aggregate size of between approximately 20 and 25 mm. The upper and lower layers 32, 34 have an aggregate size of approximately 6 mm. The intermediate layer 36 has a thickness of approximately 300 mm, while the upper and lower layers 32, 34 each have a thickness of approximately 50 mm. Again, the aggregate is a granite-based aggregate.

Applicant has found that the granite-based aggregate has very little solubility in waste water. As a result, the aggregate is resistant to blockage and does not leach harmful chemicals into the environment over time. Both the granite-based and silica sands are also highly insoluble, thus avoiding the leaching of harmful chemicals.

Set out below is a table indicating the results of a mechanical analysis carried out on a sample of the Stanthorpe Coarse sand.

| Seive | Cum (retained) (g) | Cum (retained) % | % Passed |
|---|---|---|---|
| 19 | 0 | 0 | 100 |
| 16 | 0 | 0 | 100 |
| 13.2 | 0 | 0 | 100 |
| 9.5 | 0 | 0 | 100 |
| 6.7 | 0 | 0 | 100 |
| 4.75 | 0 | 0 | 100 |
| 2.36 | 0 | 0 | 100 |
| 1.18 | 0 | 0 | 100 |
| 0.6 | 0 | 0 | 100 |
| 0.3 | 0 | 0 | 100 |
| 0.15 | 5.0 | 6.25 | 93.8 |
| 0.075 | 61.0 | 76.25 | 17.5 |
| PAN | 14.0 | 17.5 | 0.0 |
| TOTAL | 80.0 | 100.0 | 0 |

Set out below is a table indicating the results of a mechanical analysis carried out on a sample of a suitable mixture of the Stradbroke Fine White and the Stanthorpe Coarse sand.

| Seive | Cum (retained) (g) | Cum (retained) % | % Passed |
|---|---|---|---|
| 19 | 0 | 0 | 100 |
| 16 | 0 | 0 | 100 |
| 13.2 | 0 | 0 | 100 |
| 9.5 | 0 | 0 | 100 |
| 6.7 | 0 | 0 | 100 |
| 4.75 | 0 | 0 | 100 |
| 2.36 | 2.0 | 1.07 | 98.9 |
| 1.18 | 6.0 | 3.21 | 95.7 |
| 0.6 | 3.0 | 1.60 | 94.1 |
| 0.3 | 18.0 | 9.63 | 84.5 |
| 0.15 | 135.0 | 72.19 | 12.3 |
| 0.075 | 18.0 | 9.63 | 2.7 |
| PAN | 5.0 | 2.67 | 0.0 |
| TOTAL | 187.0 | 100.0 | 0 |

Set out below is a table indicating the results of a mechanical analysis carried out on a sample of the Stradbroke Fine White.

| Seive | Cum (retained) (g) | Cum (retained) % | % Passed |
|---|---|---|---|
| 19 | 0 | 0 | 100 |
| 16 | 0 | 0 | 100 |
| 13.2 | 0 | 0 | 100 |
| 9.5 | 0 | 0 | 100 |
| 6.7 | 0 | 0 | 100 |
| 4.75 | 0 | 0 | 100 |
| 2.36 | 0 | 0 | 100 |
| 1.18 | 0 | 0 | 100 |
| 0.6 | 0 | 0 | 100 |
| 0.3 | 14.0 | 9.33 | 90.7 |
| 0.15 | 118.0 | 78.67 | 12.0 |
| 0.075 | 14.0 | 9.33 | 2.7 |
| PAN | 4.0 | 2.67 | 0.0 |
| TOTAL | 150.0 | 100.0 | 0 |

Set out below is a table indicating the sieve analysis results of a test carried out on a further suitable sample of a sand for use in the sand filter apparatus of the invention.

| Seive (mm) | Sieve (#) | Cum (retained) (g) |
|---|---|---|
| 0.850 | 18 | 0 |
| 0.600 | 25 | 0.02 |
| 0.500 | 30 | 0.09 |
| 0.425 | 36 | 6.02 |
| 0.300 | 52 | 7.54 |
| 0.212 | 72 | 29.0 |
| 0.150 | 100 | 60.91 |
| 0.105 | 150 | 8.28 |
| 0.075 | 200 | 0.42 |
| 0.063 | 240 | 0.14 |
| 0.053 | 300 | 0 |
| PAN | | 0.06 |

Figure 2:
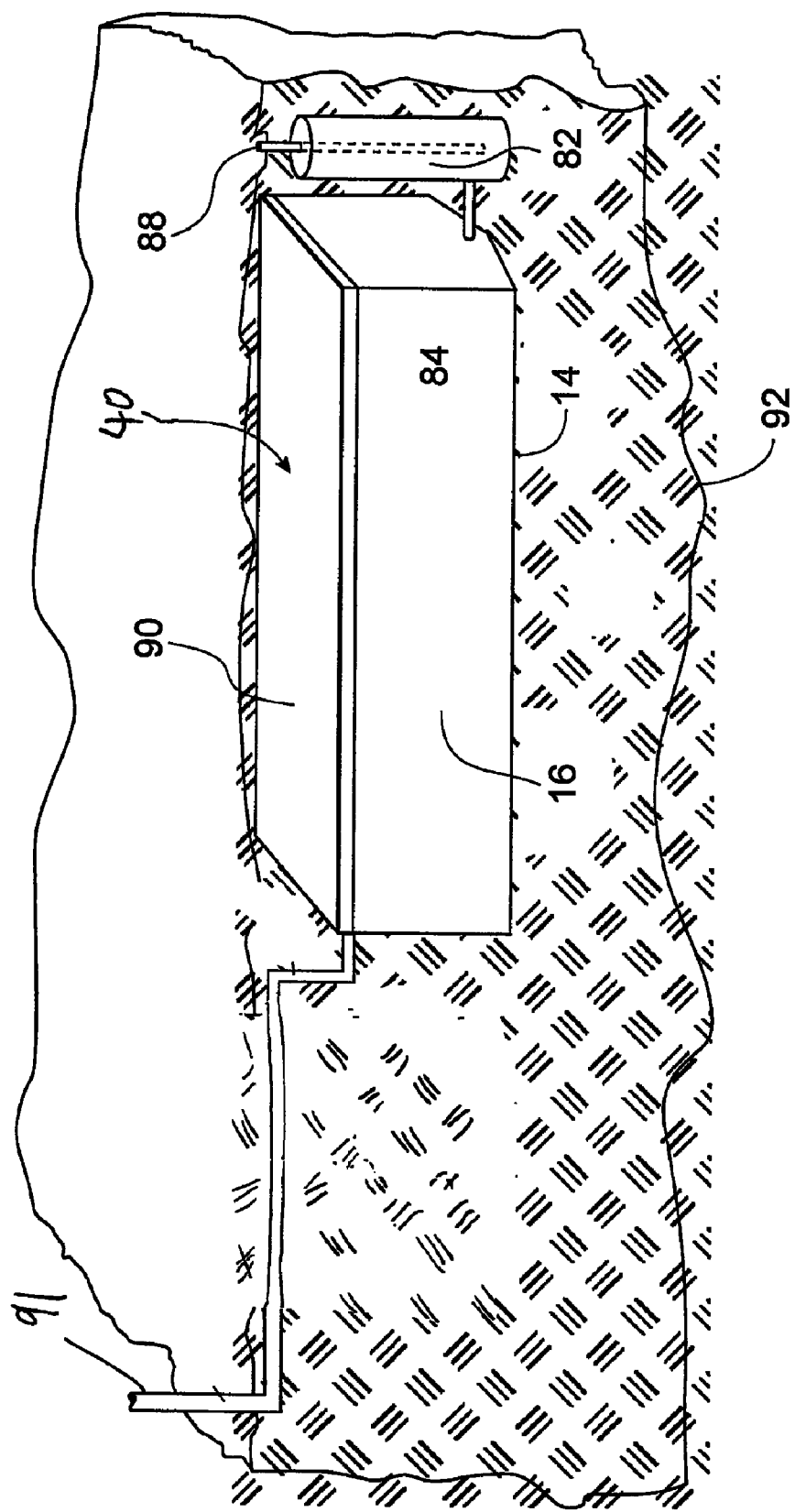
FIG. 2 shows the sand filtration apparatus, in use.
Figure 3:
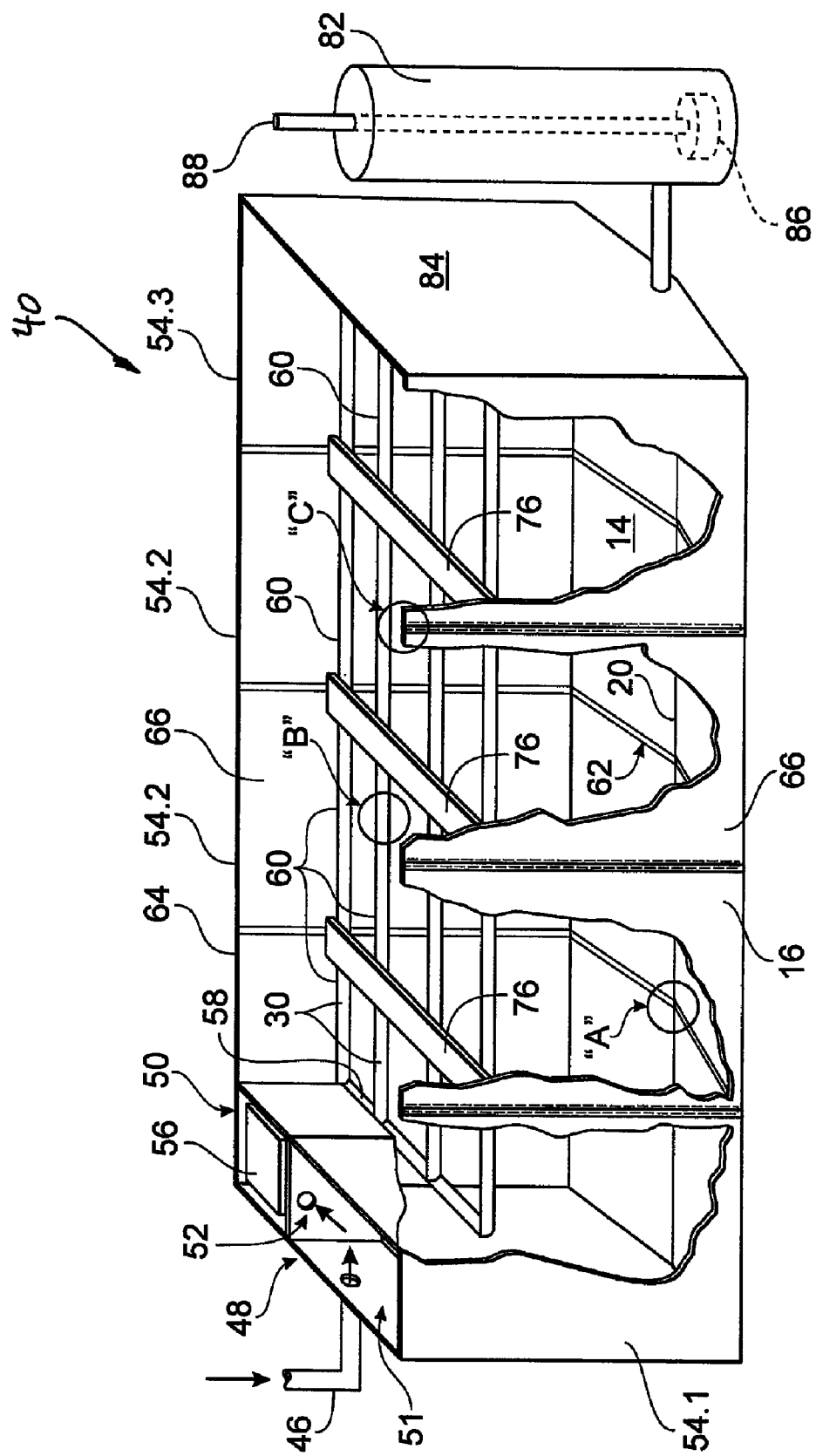
FIG. 3 shows a cut-away view of a sand filtration apparatus, in accordance with the invention, without sand, for the purpose of clarity.

In FIG. 2, reference numeral 40 generally indicates a sand filtration apparatus, in accordance with the invention, in use. The apparatus 40 is shown without sand in FIG. 3.

The vessel 16 of the apparatus 40 is modular in the sense that the apparatus 40 includes vessel modules 54 that can be connected together so that the vessel 16 can have a pre-selected length. The modules 54 include a front module 54.1, a number of intermediate modules 54.2, depending on a desired length of the vessel 16, and an end module 54.3.

The vessel 16 has a lid 90 and, in use, is positioned in the ground 92 to be gravity fed with discharge from a source of waste water indicated at 91.

The front module 54.1 includes an inlet arrangement 48 that is connected to the outlet 46. The inlet arrangement 48 includes an inlet settling tank 51 in which the discharge is collected. The inlet arrangement 48 includes a carbon filtration vessel 50 with an inlet 52 in fluid communication with the inlet tank 51 to receive discharge from the tank 51 after some settling and aerobic degeneration has taken place in the inlet tank 50.

A carbon filter 56 incorporating high activity carbons is positioned in the vessel 50. A suitable example of a carbon filter 56 is that which uses high activity carbons supplied by Sutcliffe Speakman Carbons Ltd, a United Kingdom company. These are also known as Aquacarb 207C and 208C (trade marks).

An outlet (not shown) of the filter 56 is in fluid communication with a manifold 58 which receives filtered water from the filter 56. A series of feed conduits or pipes 60 are connected to the manifold 58 to extend along a length of the vessel 16. Each feed pipe 60 is modular and includes a number of pipe elements assembled together so that the feed pipe corresponds to a length of the vessel 16.

In one example, the vessel modules 54 are connected together with corresponding clipping formations 62 as shown in FIGS. 4 and 7, where FIG. 4 shows the clipping formations 62 at the apex 20 of the floor 14 and FIG. 7 shows the clipping formations 62 at adjacent top edges 64 of side walls 66. The clipping formations 62 are in the form of interlocking members 68 that engage each other as shown in the figures. A seal 70 is interposed between the clipping formations 62 to seal a joint 72 defined by the clipping formations 62.

As can be seen in FIG. 4, the clipping formations 62 at the apex 20 define openings 74 that permit the filtrate conduit 18 to be positioned along the apex 20, facilitating the passage of filtrate along the apex 20. In use, the vessel 16 is installed so that the filtrate is gravity-fed to the end module 54.3 via the filtrate conduit 18.

Support members in the form of cross bars 76 engage the clipping formations 62 at top edges 64 of respective adjacent modules 54, as shown in FIG. 6. The cross bars 76 support the side walls 66 in a spaced condition while the sand filter is formed in the vessel 16.

Figure 21:
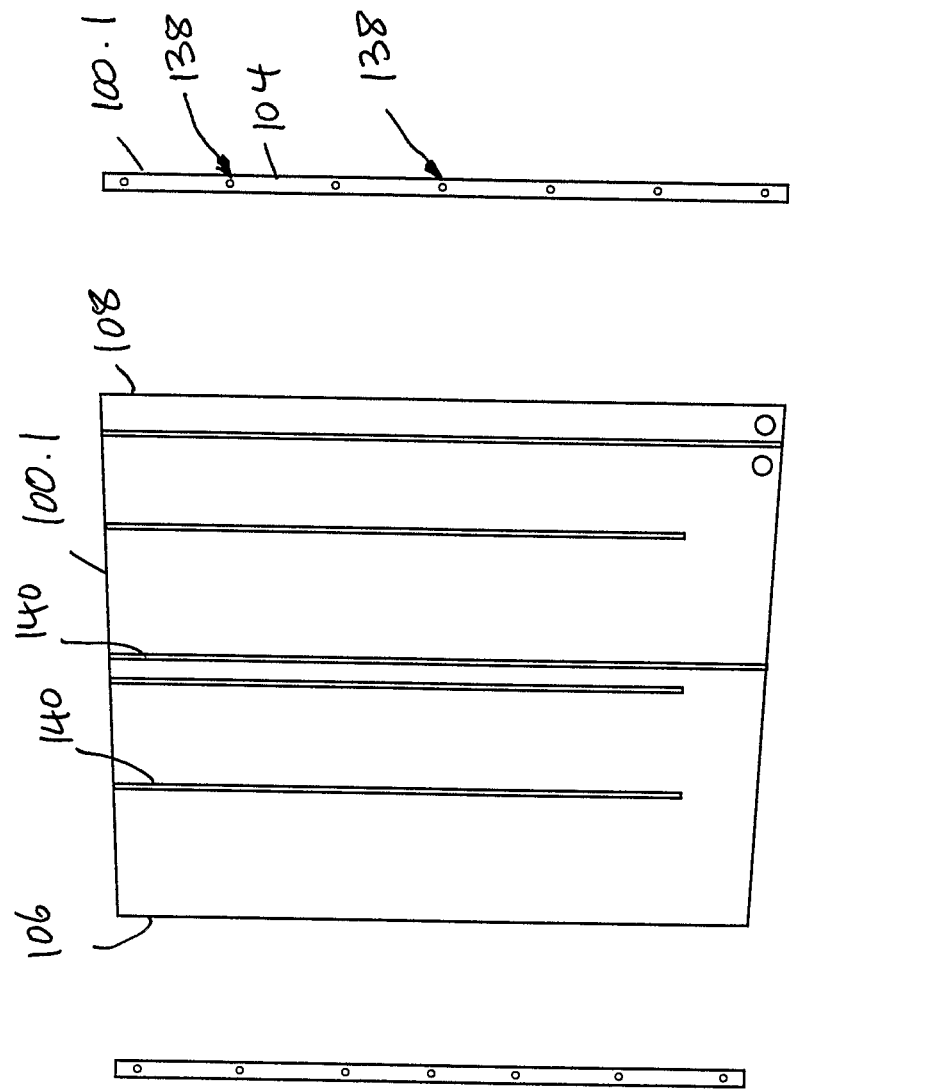
FIG. 21 shows front, side and end views of an end or middle panel of the sand filter apparatus of FIG. 3.
Figure 22:
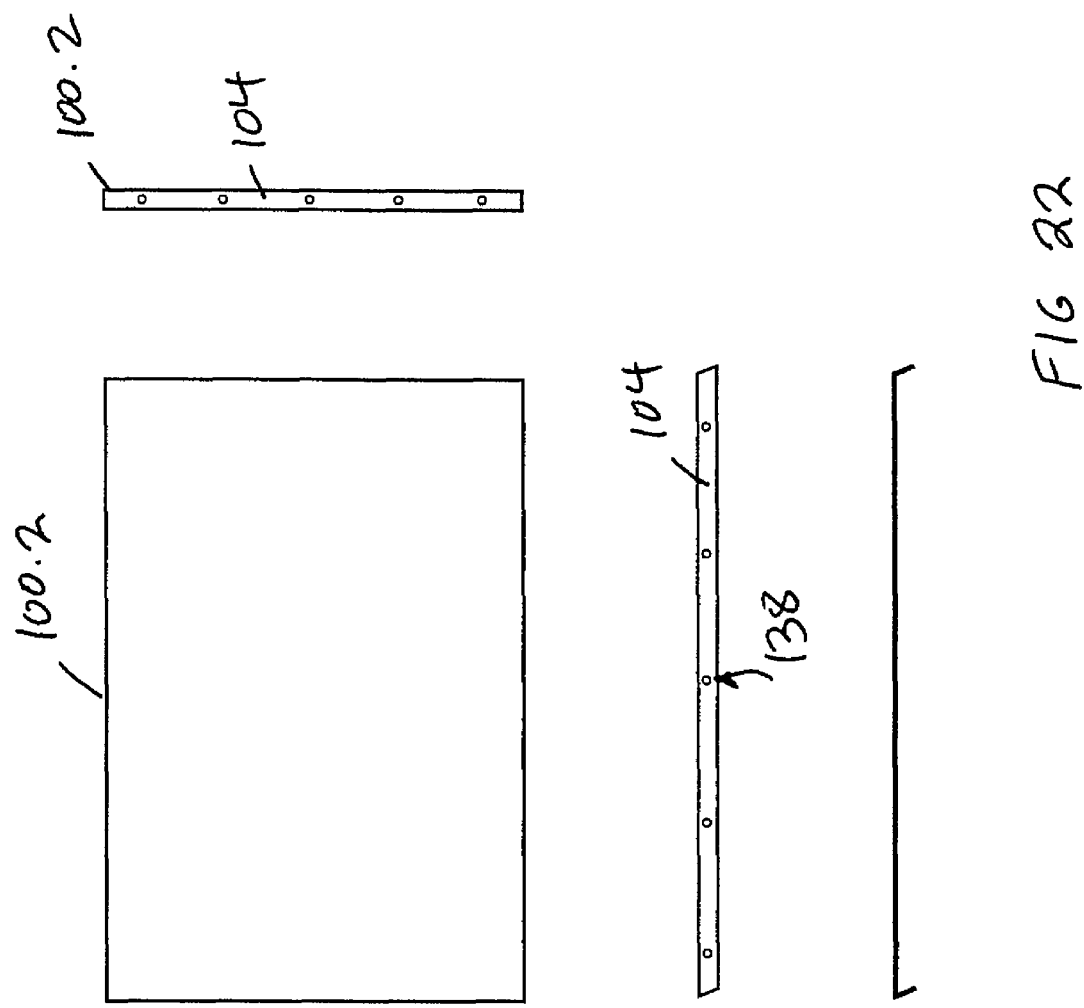
FIG. 22 shows front, side and end views of bottom and top panels of the sand filter apparatus of FIG. 3.

Instead of the clipping formations 62, each of the vessel modules 54 can be erected with substantially identical panels 100. Details of the panels are shown in FIGS. 21 to 23 and the manner in which the panels 100 are connected is shown in FIG. 24 to 26.

The panels 100 are provided as end or middle panels 100.1, floor and lid panels 100.2 and side panels 100.3. Each of the panels 100 has a planar body portion 102 and a peripheral flange 104 extending orthogonally with respect to the body portion 102.

The end or middle panels 100.1 are configured so that two of the panels 100.1 can make up the end wall 84. Thus, an outer edge 106 of each of the panels 100.1 is shorter than an inner edge 108.

Each panel 100.1 has a series of elongate reinforcing ribs 140 to brace the panel 100.1.

The flanges 104 of the panel 100.1 define a series of openings 138 for suitable fasteners 141.

The floor and lid panels 100.2 have angled side flanges 104 to facilitate nesting of pairs of the panels 100.2 to form either the floor 14 or the lid 11 of the vessel 16. The side flanges 104 of the bottom and lid panels 100.2 also define a series of openings 138 for suitable fasteners 140.

Thus, as can be seen in FIG. 5, the floor 14 of each module 54 is formed from a pair of the panels 100.2, fastened together to form a pair of floor panels. Likewise, as can be seen in FIG. 8, the panels 100.3 are connected together to form the side walls 66 with the cross bars 76 simply bearing against the side walls 66.

In FIG. 24, the manner in which a pair of floor panels 100.2 is connected together is shown. The manner in which the floor panels 100.2 are connected to the side panels 100.3 is also shown.

In FIG. 25, the manner in which one of the floor panels 100.2 is connected to a corresponding end or middle panel 100.1 is shown.

It will be appreciated that the apparatus 40 can be substantially entirely provided as a stack of panels and a bundle of pipes. Thus, pre-installation storage and transport is greatly facilitated.

The panels 100 are sealed together with an application of a suitable sealant, indicated at 105.

A portion of each pipe 60 is shown in FIG. 5. Each pipe 60 has a number of elongate slots 78 that extend along a length of the pipe 60. In use, water, shown at 80, flows into the pipes 60 and is expelled from the slots 78. Thus, the water 80 is dispersed substantially evenly over the sand and aggregate layers.

A filtrate tank 82 is mounted on an end wall 84 of the end module 54.3. The filtrate tank 82 is in fluid communication with the end module 54.3 to receive filtrate from the end module 54.3. A submersible pump 86 is positioned in the filtrate tank 82 to pump filtrate from the tank 82 via a discharge conduit 88.

The vessel 16 of the apparatus 10 can be dimensionally adjusted to suit applications of a variable size. For larger applications, further vessel modules can be added to increase the volume of the vessel 16 and thus a quantity of sand and aggregate to increase the filtration capacity of the apparatus 10.

Applicant has found that the selection of the above sand and aggregate layers provides a slow sand filter that is extremely low maintenance and is highly efficient. This has been achieved both by the selection of the sand and the aggregates and by the design of the configuration of the sand and aggregate layers. Applicant has found that the apparatus of the invention results in a high retention of an active population of micro-organisms in the sand and aggregate. Furthermore, as discussed above, the particular sand and aggregate selected has a very low solubility in water and leaching of undesirable chemicals is thus inhibited.

Applicant has found the provision of the upper layer 24 of aggregate to be particularly beneficial. The reason for this is that the configuration of the upper layer 24 facilitates the colonization of the aggregate of the upper layer 24 by suppressive micro-organisms. Rather than simply forming a layer on the sand, such as in the formation of a schmutzdecke, the micro-organisms become dispersed in the upper layer 24. Thus, the micro-organisms form a much larger effective working area than if the micro-organisms themselves formed a layer. As a result, flow of water into the sand layer 26 is not obstructed by the micro-organisms. This significantly reduces maintenance.

Since the apparatus 40 requires very little, if any, maintenance, it can be buried in the ground. This results in the apparatus 40 being protected from temperature fluctuations that could disturb the micro-organisms. In colder climates, the apparatus 40 could be buried to be heated with geothermal energy, thereby enhancing growth and activity of the micro-organisms in the upper layer 24.

Various tests have been carried out on the apparatus 40 by the Queensland Health Scientific Services in Australia.

The tests indicated no detectable coliform and *e. coli* using the MPN method on the filtrate generated by the apparatus 40. The test samples had a coliform reading greater than 2400 and an *e. coli* reading of 79. Furthermore, the Queensland Health Scientific Services certified that the filtrate was potable and complied with the National Health and Medical Research Council (Australia) guidelines of 2004 for drinking water.

Figure 19:
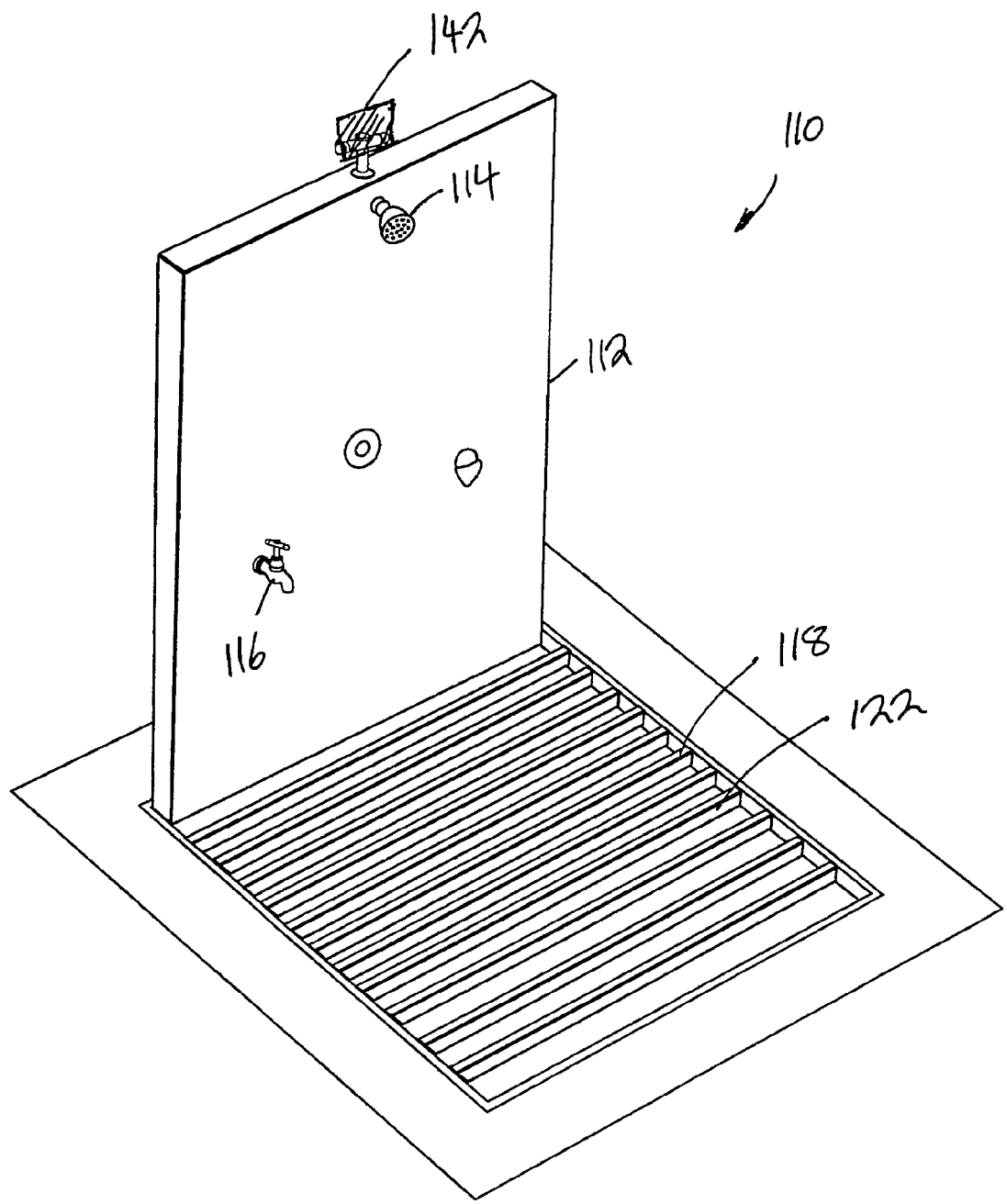
FIG. 19 shows an outdoor shower arrangement, in accordance with the invention, using the sand filter apparatus of FIG. 1.
Figure 20:
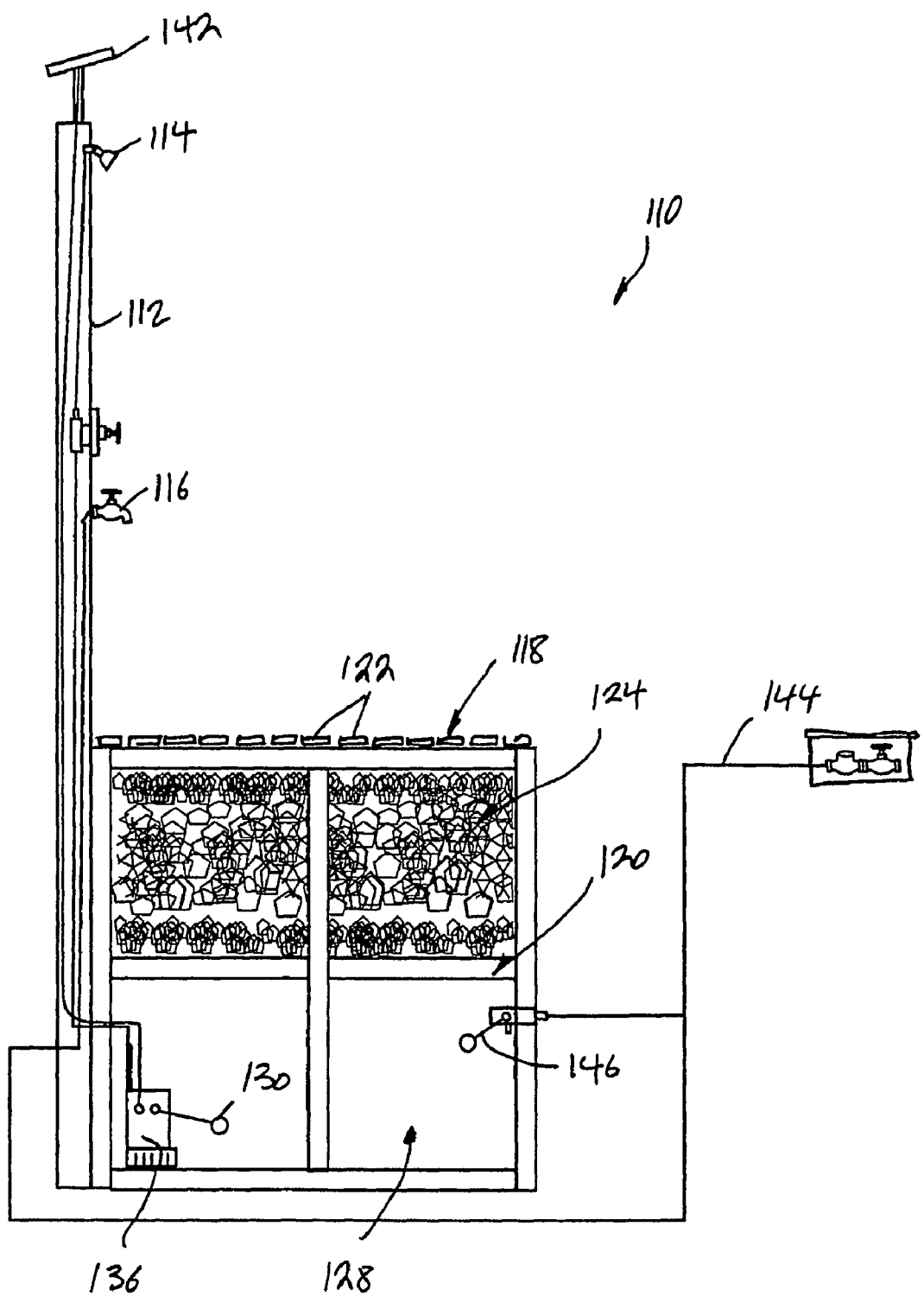
FIG. 20 shows a side sectioned view of the shower arrangement of FIG. 19.

In FIGS. 19 and 20, reference numeral 110 shows an ablution arrangement, in accordance with the invention. The ablution arrangement is an outdoor shower and faucet arrangement. With reference to the preceding drawings, like reference numerals refer to like parts, unless otherwise specified.

The arrangement 110 includes a shower stand 112 with a shower rose 114 and a faucet 116. A platform 118 is supported above a pit 120. The platform 118 is formed from a series of slats or planks 122 that span the pit 120 and allow waste water to pass into the pit 120.

A filter 124 is supported on a suitable screen or grid 126 positioned above a filtrate reservoir 128 so that filtrate from the filter 124 is received in the reservoir 128.

The filter 124 is a slow sand filter with substantially the same sand and aggregate composition as the apparatus 10, 40.

The faucet 116 and the shower rose 114 are connected to supply conduits 134 which, in turn, are connected to a submersible pump 136 to pump water from the filtrate reservoir 128 to the faucet 116 and the shower rose 114.

A float control switch 130 is connected to the submersible pump 136 to switch off the submersible pump 136 when a filtrate level drops below a predetermined level.

A solar panel 142 is mounted on the stand 112 and is connected to the submersible pump 136 to power a motor of the submersible pump 136.

The faucet 116 and shower rose 114 are also connected to a municipal water supply 144. A further float control switch 146 is operatively connected to the municipal water supply 144 to provide the faucet 116 and shower rose 114 with municipal water when the level of filtrate in the reservoir 128 reaches a predetermined level.

This embodiment finds particular application in public showers, such as those found outdoors near, for example, the beachfront. Such public showers and faucets are often the source of wastage of water. It will be appreciated that the use of the filter 124 provides a means for safe recycling of water.

Figure 9:
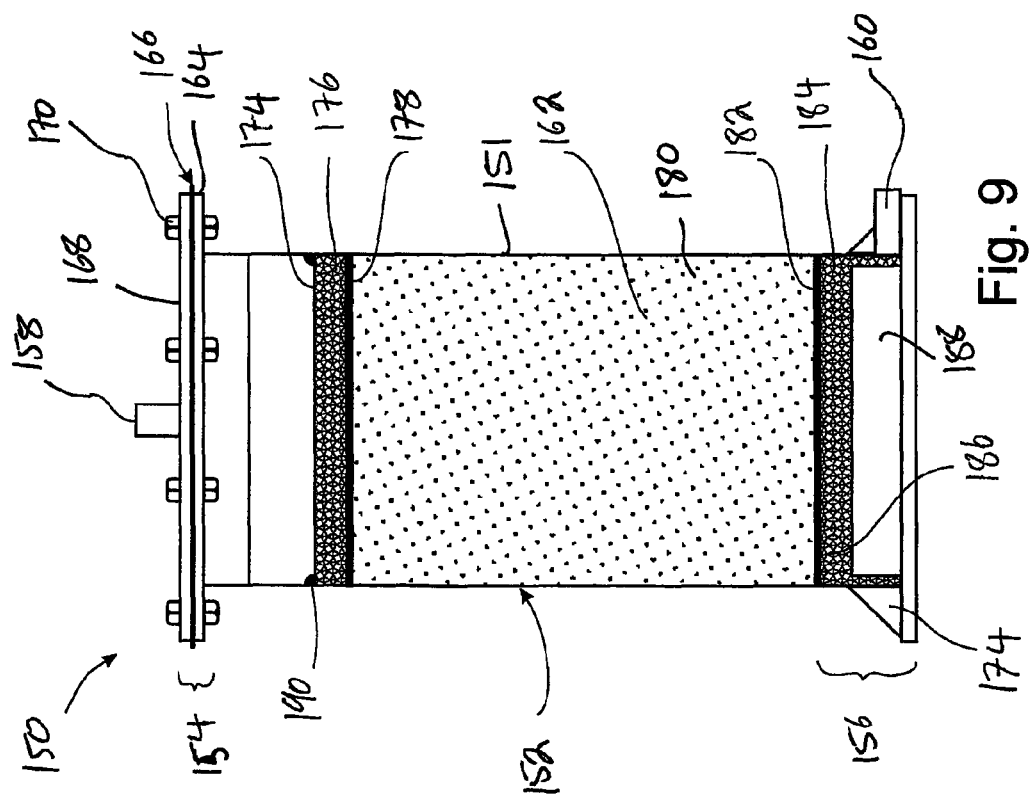
FIG. 9 shows a schematic sectioned side view of a sand filter apparatus in accordance with a further embodiment of the invention.

According to a further embodiment of the present invention, there is provided a sand filter apparatus 150 for filtering water as shown in FIG. 9. The sand filter apparatus 150 includes a vessel 151 which is formed from a cylindrical wall 152 to which a cover 154 and a base 156 are secured. The cover 154 includes an inlet 158 through which water to be filtered can be supplied. The base 156 includes an outlet 160 through which filtered water can be discharged. A filter 162 is located in the vessel between the inlet 158 and the outlet 160 so as to filter the water. The components of the sand filter apparatus 150 are described in detail below.

The cover 154 includes a lower plate 164 which is fast with the cylindrical wall 152. The cover 154 further includes a gasket 166 and an upper plate 168. In use, the upper and lower plates 168, 164 are bolted together using a plurality of bolts 170 located around the periphery of the plates (FIG. 13), with the gasket 166 being sandwiched there-between to form a seal.

As can best be seen from FIG. 13, the base 156 includes a circular plate 172 from which a quartet of support ribs 174 extends. The support ribs 174 are used to support the base of the vessel wall 152.

Returning to FIG. 9, the filter is located in the vessel between the inlet 158 and the outlet 160. The filter 162 includes, in consecutive order, a top strainer 174, an upper layer of pebbles 176, a first geo-fabric layer 178, a sand layer 180, a second geo-fabric layer 182, a lower layer of pebbles 184, a third geo-fabric layer 186 and a bottom strainer 188. In use, water enters the vessel 151 through the inlet 158 and then passes sequentially through each of these layers before exiting via the outlet 160.

Figure 10:
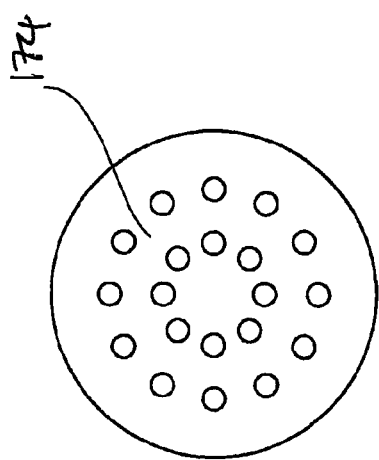
FIG. 10 shows a plan view of a top strainer of the sand filter apparatus of FIG. 9.
Figure 11:
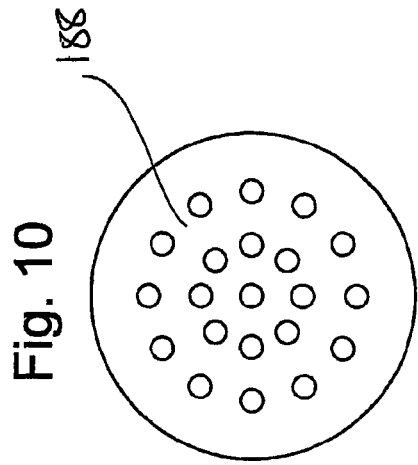
FIG. 11 shows a plan view of a bottom strainer of the sand filter apparatus of FIG. 9.

The strainers 174, 188 are circular disks in which a plurality of apertures are defined (in concentric rings) as shown in FIGS. 10 and 11. The layers of the filter are held together between the strainers 174, 188. The bottom strainer 188 rests upon the circular plate 172 of the base 156. During manufacture, the other layers of the filter 162 are then sequentially provided in the vessel 151. The top strainer 174 is then welded to the wall 152 to form a continuous weld 190 which extends around the cylindrical wall 152.

The pebble layers 176, 184 may include bluestone pebbles or other like aggregate which are graded less than about 5 mm in diameter. Each pebble layer 176, 184 is typically 25 mm deep. In one preferred embodiment, each pebble layer 176, 184 comprises calcium carbonate pebbles, and, more specifically, marble pebbles.

As previously described, the layer of sand 180 is at least one of, or a mixture of granite-based sand and substantially pure silica sand. The sand layer 180 is typically 450 mm deep.

Each geo fabric layer 178, 182, 186 is formed from one or more sheets of drainage cloth.

A sand filter module 192 of like construction to that shown in FIG. 9 is shown in FIG. 14. Like reference numerals in FIG. 14 relate to similar features previously described in relation to FIG. 9. The sand layer 180 in the module 192 is typically about 200 mm deep. The bottom strainer 188 may be welded to the wall 152. In use, the module 192 may be connected in series to the sand filter apparatus 150. Naturally, the module 192 may also be used as a stand alone unit.

In FIGS. 15 to 17, reference numeral 200 generally indicates a further embodiment of a sand filter apparatus, in accordance with the invention. With reference to FIGS. 9 to 14, like reference numerals refer to like parts, unless otherwise specified.

The sand filter apparatus 200 is configured for substantially horizontal water flow. Thus, an inlet 202 and an outlet 204 of the vessel 151 are positioned so that, when the vessel is in a horizontally operative condition, the inlet 202 is above the outlet 204.

The apparatus 150 finds particular application in the filtration and treatment of cooling water for industrial and ducted air conditioning systems.

Figure 18:
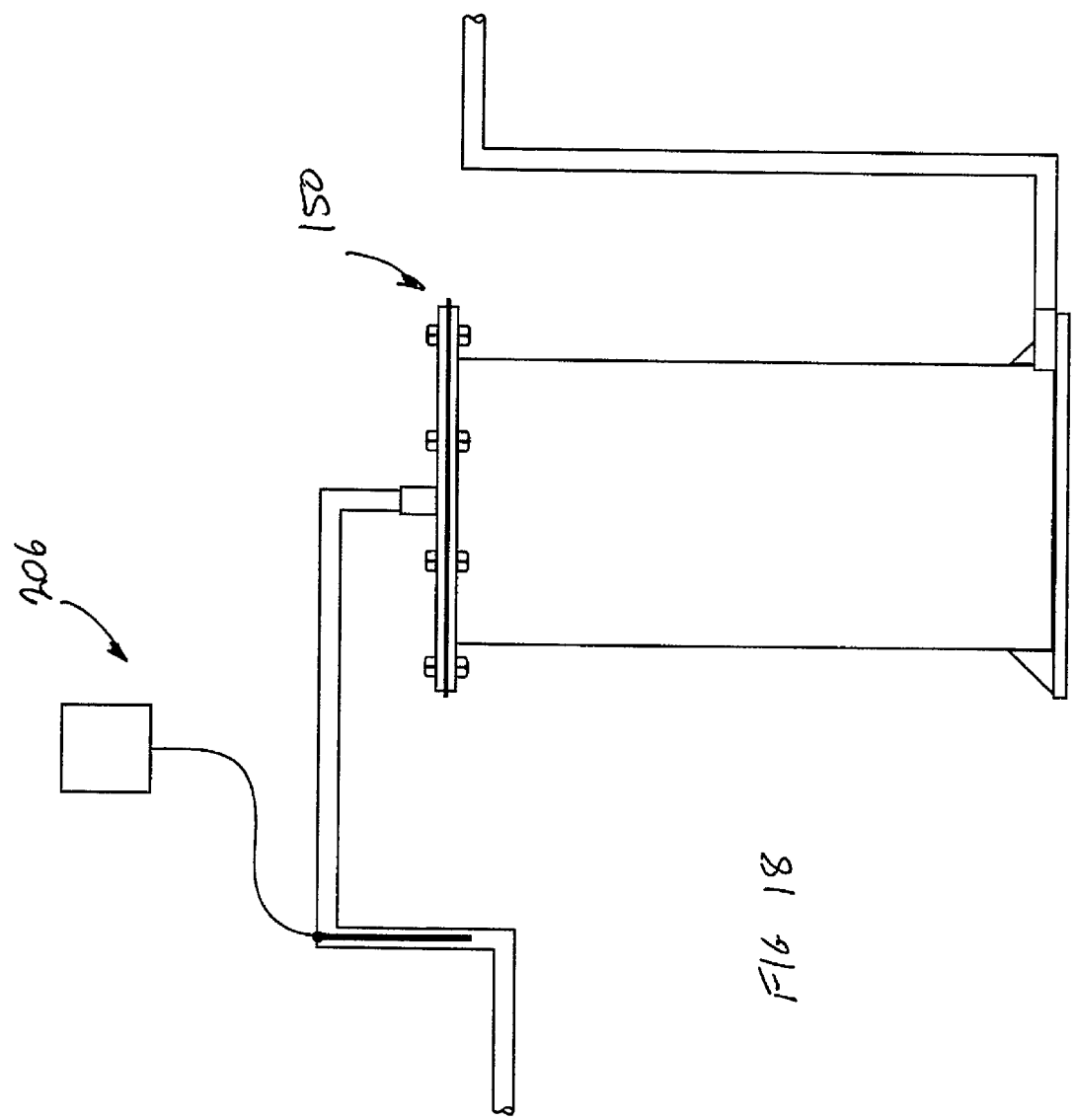
FIG. 18 shows the sand filter apparatus of FIG. 9, installed with an ion stick arrangement upstream of the sand filter apparatus.

FIG. 18 shows the apparatus 150 in use with an ion stick arrangement 206. As is known, such an arrangement provides a non-chemical manner of treating water. It will be appreciated that, in the case of cooling water for air conditioning plants, the ion stick arrangement 206 serves to de-scale pipes and valves exposed to the cooling water. Since the apparatus 150 is substantially maintenance-free, the combination of the apparatus 150 and the ion stick arrangement 206 provides a system whereby chemicals are never required to treat the cooling water.

In use, as the cooling water circulates through the apparatus 150, the suppressive micro-organisms quickly become established in the upper layer of pebbles 176. In this case, it is to be appreciated that the water need not be treated in one pass. Since the water continually circulates through the apparatus 150, so the treatment is amplified while the suppressive micro-organisms colonize the pebbles 176.

As previously, the upper layer of pebbles 176 provides a relatively large contact region for the suppressive micro-organisms and at the same time inhibits blockage of the sand layer 180. Thus, the apparatus 150 is substantially maintenance-free.

The marble pebbles of both the layers 176, 184 serve to soften and neutralize the cooling water.

Applicant has found that the cooling water circulating through the apparatus 150 quickly provides an environment that is hostile particularly to *Legionnella* bacteria, and specifically *L. pneumophila*, which is responsible for Legionnaires disease.

In compliance with the statute, the invention has been described in language more or less specific to structural or methodical features. It is to be understood that the invention is not limited to specific features shown or described since the means herein described comprises preferred forms of putting the invention into effect.

The invention is defined in the following claims:

1. A sand filter apparatus for treating water, the apparatus including
    a filter retention vessel having an outlet from which filtrate can be supplied, a floor, a pair of opposed side walls extending from major sides of the floor and a pair of end walls extending from minor sides of the floor;
    an inlet arrangement in fluid communication with the filter retention vessel and connectable to a supply of water to be treated;
    a filter interposed between the inlet arrangement and the outlet and spanning the floor so that a width of the filter is a distance between the side walls, the filter including two layers of aggregate, being one of a granite-bases aggregate and a calcium carbonate-based aggregate, and a layer of sand interposed between the two layers of aggregate, one of the two layers of aggregate being a lower aggregate layer positioned on the floor and the other of the two layers of aggregate being an upper aggregate layer positioned on a top of the layer of sand, the sand being at least one of granite-based sand and substantially pure silica sand and a mixture of granite-based sand and substantially pure silica sand, and the upper aggregate layer having an intermediate sub-layer with an aggregate size of between approximately 20 mm and 25 mm, a top sub-layer with an aggregate size of between approximately 3 mm and 10 mm and a lower sub-layer with an aggregate size of between 3 mm and 10 mm; and
    a distribution arrangement that is connected to the inlet arrangement and that is configured to distribute waste water from the inlet to the filter, the distribution arrangement being positioned in the upper aggregate layer and configured so that waste water is distributed substantially evenly into the upper aggregate layer.

2. A sand filter apparatus as claimed in claim 1, in which the inlet arrangement is connectable to one of discharge plumbing and a discharge outlet of a waste water treatment apparatus.

3. A sand filter apparatus as claimed in claim 1, in which one of a geo-fabric layer and a drainage cloth is interposed between the layer of sand and each layer of aggregate.

4. A sand filter apparatus as claimed in claim 1, in which the filter retention vessel is modular and includes at least one filter retention vessel module that is configured to be fastened to a further filter retention vessel module if a length of the filter retention vessel is to be increased, the, or each, filter retention vessel module including a floor module and side wall modules so that an effective floor and side wall length can be increased with further retention vessel modules.

5. A sand filter apparatus as claimed in claim 4, in which a modular distribution arrangement is connected to the inlet arrangement to accommodate the filter retention vessel.

6. A sand filter apparatus as claimed in claim 1, in which the floor, side wall and end walls of the filter retention vessel are in the form of substantially flat panels configured to be fastened together, on site.

7. A sand filter apparatus as claimed in claim 1, in which the lower aggregate layer has a depth to width ratio of between 0.05 and 0.15.

8. A sand filter apparatus as claimed in claim 1, in which the lower aggregate layer itself has a lower sub-layer with an aggregate size of between approximately 20 mm and 25 mm and an upper sub-layer with an aggregate size of between approximately 3 mm and 10 mm.

9. A sand filter apparatus as claimed in claim 8, in which the lower sub-layer has a depth to width ratio of between 0.025 and 0.125 and the upper sub-layer has a depth to width ratio of between 0.003 and 0.03.

10. A sand filter apparatus as claimed in claim 1, in which the upper sub-layer has a depth to width ratio of between 0.003 and 0.03, the intermediate sub-layer has a depth to width ratio of between 0.025 and 0.125 and the lower sub-layer has a depth to width ratio of between 0.003 and 0.03.

11. A sand filter apparatus as claimed in claim 1, in which a depth to width ratio of the sand layer is 0.125 to 0.375.

12. A sand filter apparatus as claimed in claim 1, in which the inlet arrangement is positioned at one of the end walls of the vessel and includes a catchment vessel in which waste water to be filtered is collected.

13. A sand filter apparatus as claimed in claim 12, in which the inlet arrangement includes a settling vessel in which waste water is received to permit settling and initial bio-degradation of the waste water prior to filtration.

14. A sand filter apparatus as claimed in claim 1, in which the distribution arrangement includes a distribution manifold connected to the inlet arrangement and spanning the vessel.

15. A sand filter apparatus as claimed in claim 14 in which a series of feed conduits extends from the distribution manifold along a length of the filter retention vessel so that waste water is distributed substantially evenly into the upper aggregate layer.

16. A sand filter apparatus as claimed in claim 15, in which each feed conduit defines feed openings positioned so that waste water is fed substantially evenly along a length of each feed conduit.

17. A sand filter apparatus as claimed in claim 1, in which the floor of the vessel is shaped to have a deepest zone to facilitate the collection of filtrate, a filtrate conduit being positioned in the deepest zone and defining filtrate openings to permit filtrate to be fed into the conduit from the lower aggregate layer and the filtrate conduit being connected to the outlet so that filtrate can be fed from the filter retention vessel.

18. A sand filter apparatus as claimed in claim 1, which includes a filtrate vessel connected to the outlet to receive and store filtrate.

19. A method of constructing a sand filtration apparatus, the method including the steps of:
forming a lower layer of aggregate being one of granite-based aggregate and a calcium carbonate bases aggregate, on a floor of a filter retention vessel having a pair of opposed side walls extending from major sides of the floor and a pair of end walls extending from minor sides of the floor, an inlet arrangement being in fluid communication with the filter retention vessel and connectable to a supply of water to be treated;
forming a layer of at least one of granite-based sand, substantially pure silica sand and a mixture of granite-based sand and substantially pure silica sand on a top of the lower layer of aggregate;
forming an upper layer of aggregate on a top of the layer of sand, the upper layer aggregate having an intermediate sub-layer with an aggregate size of between 20 mm and 25 mm, a top sub-layer with an aggregate size of between approximately 3 mm and 10 mm and a lower sub-layer with an aggregate size of between 3 mm and 10 mm; and
positioning a distribution arrangement in the upper layer, the distribution layer being connected to the inlet arrangement and configured to distribute waste water substantially evenly from the inlet arrangement into the upper layer.

20. A method as claimed in claim 19, which includes the step of positioning one of a geo fabric cloth and a drainage cloth between the layer of sand and each layer of aggregate.

* * * * *